Feb. 15, 1927.
H. HUGHSON
UNIVERSAL JOINT
Filed Feb. 13, 1924
1,617,908
2 Sheets-Sheet 1
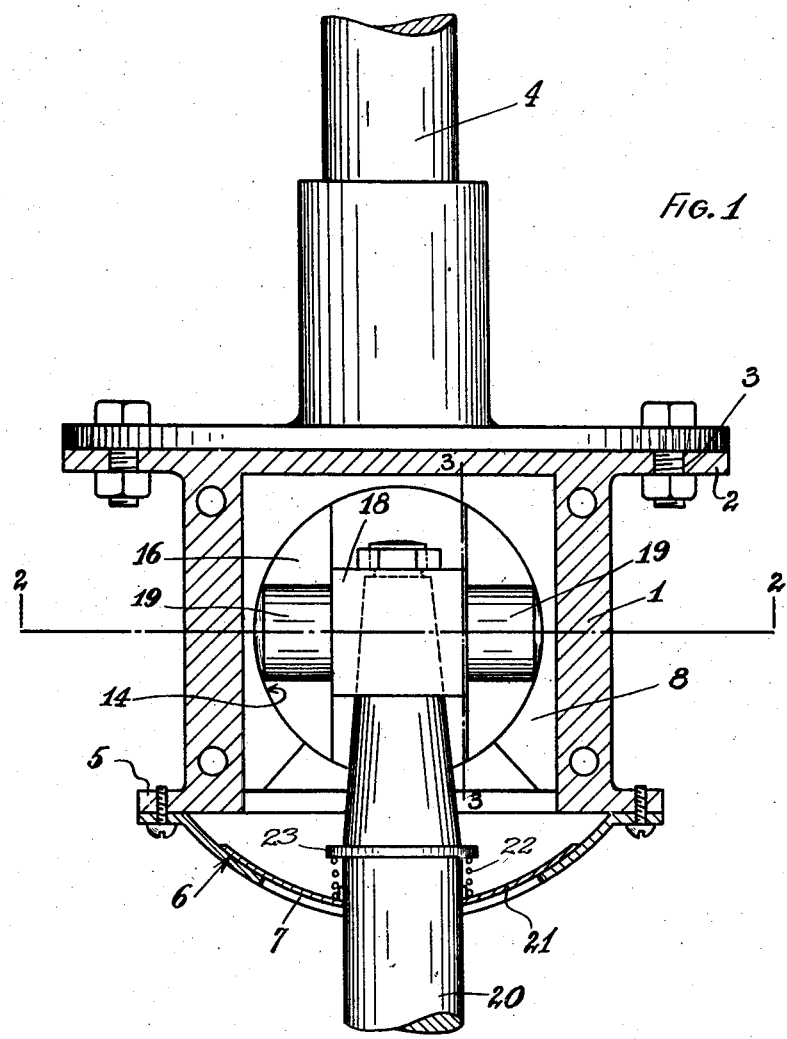
FIG. 1
INVENTOR
*HARRY HUGHSON*
BY
ATTORNEY Feb. 15, 1927.

H. HUGHSON

UNIVERSAL JOINT

Filed Feb. 13, 1924

INVENTOR
HARRY HUGHSON
BY
ATTORNEY

Patented Feb. 15, 1927.

1,617,908

UNITED STATES PATENT OFFICE.

HARRY HUGHSON, OF BERKELEY, CALIFORNIA.

UNIVERSAL JOINT.

Application filed February 13, 1924. Serial No. 692,462.

My invention is an improved universal joint, particularly applicable to motor vehicles.

The object of my invention is to provide a means to compensate for wear in the joint.

Another object is to provide a joint which is simple in construction and inexpensive to manufacture.

In the annexed drawing in which my invention is illustrated:

Figure 1 is a plan view of my joint with the top bearing cap removed.

Figure 2:
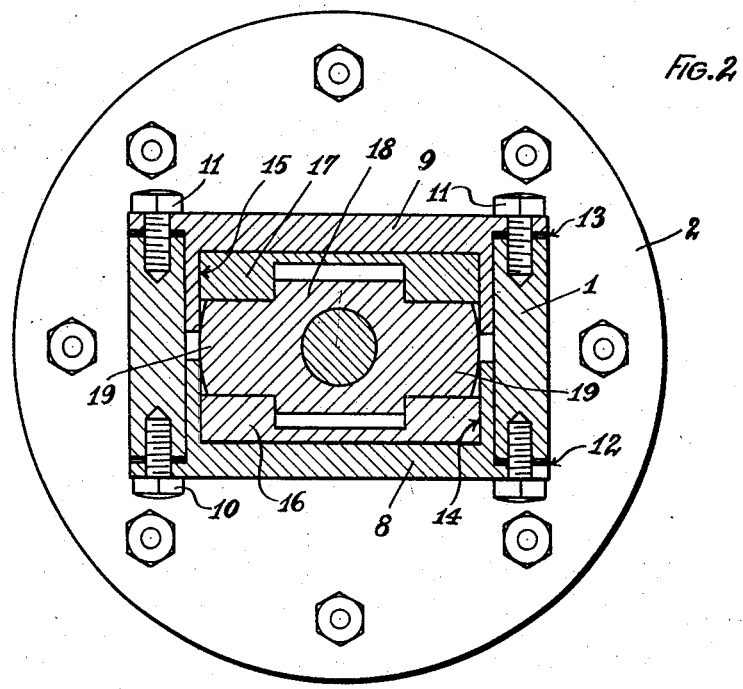
Figure 2 is a sectional view taken on the line 2—2 of Fig. 1.
Figure 3:
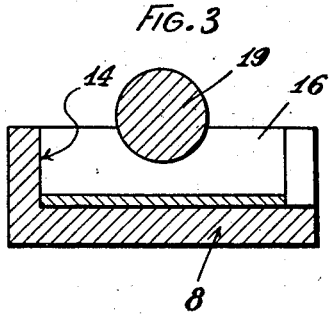
Figure 3 is a transverse sectional view of the bearing cap and bearing taken on the line 3—3 of Fig. 1.

Referring more particularly to the drawing, my joint comprises a hollow casing 1, on one end of which a flange 2 is formed. A flange 3 on the driving shaft 4 is bolted to the flange 2. On the opposite end of the casing 1, from the flange 2, a second flange 5 is formed to which a cover plate 6 is secured. This plate has an opening 7 formed therein the purpose of which will be further described.

Bearing caps 8 and 9 are positioned on the bottom and top respectively of the casing 1 and are secured thereto by cap screws 10 and 11 respectively. Shims 12 and 13 are positioned respectively between the caps 8 and 9 and the casing 1, the purpose of which will be further described. The caps 8 and 9 are formed with central bores 14 and 15 respectively, in which discs 16 and 17 are journaled. A block 18 has trunnions 19—19 which are journaled in both the discs 16 and 17. The driven shaft 20 is secured in the block 18 on a taper, and a closure plate 21 encircles this shaft and covers the opening 7. A spring 22 is placed between a collar 23 on the shaft 20 and the plate 21 to urge said plate against the cover 6.

The operation of my joint will be readily understood from the foregoing description in which it was shown that the discs 16 and 17 rotate in the caps 8 and 9, and the block 18 rotates between these discs on trunnions 19—19 giving the required universal joint motion. The wear in the joint is compensated for by reducing the thickness of the shims 12 and 13 which lower the caps 8 and 9 and press the discs 16 and 17 against the trunnions 19—19 where the majority of the wear occurs.

Having described my invention, I claim:

1. A universal joint comprising a pair of shafts, a frame carried by said shafts bearing members carried by said frame and being adjustable toward each other for taking up wear, discs movably carried by said bearing members, trunnions carried by the other shaft and being rotatively received between said discs whereby said last named shaft is universally connected to the other shaft, said bearing members being adapted to move the said discs for causing said discs to take up wear between said trunnions and said discs.

2. A universal joint comprising a shaft, a frame carried by said shaft bearing plates carried by said frame, discs being entirely received by said bearing plates and being rotatively mounted therein, a second shaft, trunnions carried by said second named shaft, being rotatively received between said discs, and means for moving said bearing plates toward each other whereby said discs will take up wear between said trunnions and said discs.

In testimony whereof I affix my signature.

HARRY HUGHSON.